United States Patent
Tsuchiya (10) Patent No.: US 11,262,710 B2
(45) Date of Patent: Mar. 1, 2022

(54) TIMEPIECE WITH PHYSICAL AUTHENTICATION MARK

(71) Applicant: Seiko Instruments Inc., Chiba (JP)

(72) Inventor: Tadashi Tsuchiya, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 443 days.

(21) Appl. No.: 16/291,905

(22) Filed: Mar. 4, 2019

(65) Prior Publication Data
US 2019/0278234 A1 Sep. 12, 2019

(30) Foreign Application Priority Data
Mar. 7, 2018 (JP) .............................. JP2018-041193

(51) Int. Cl.
*G04R 60/10* (2013.01)
*G04G 21/04* (2013.01)
*H01Q 1/22* (2006.01)
*H04W 12/06* (2021.01)

(52) U.S. Cl.
CPC ............. *G04R 60/10* (2013.01); *G04G 21/04* (2013.01); *H01Q 1/22* (2013.01); *H04W 12/06* (2013.01)

(58) Field of Classification Search
CPC .......... G04R 60/10; G04G 21/04; H01Q 1/22; H04W 12/06
USPC ........................................................... 368/47
See application file for complete search history.

(56) References Cited

U.S. PATENT DOCUMENTS

| | | | | |
|---|---|---|---|---|
| 6,825,751 | B1 * | 11/2004 | Kita ................. | G06K 19/07762 340/10.52 |
| 7,433,273 | B2 * | 10/2008 | Oguchi .................. | G04G 21/04 368/47 |
| 9,130,272 | B2 * | 9/2015 | Fujisawa ................ | H01Q 1/273 |
| 10,116,044 | B2 * | 10/2018 | Zhu ........................ | H04W 88/06 |

FOREIGN PATENT DOCUMENTS

JP 2016-173240 A 9/2016

\* cited by examiner

*Primary Examiner* — Edwin A. Leon
(74) *Attorney, Agent, or Firm* — Crowell & Moring LLP (57) ABSTRACT

A timepiece includes an antenna performing at least one of reception and transmission of an electric wave of a specific communication; an authentication mark certifying that the specific communication conforms to a technical standard; and a board in which wiring connected to an IC for controlling the specific communication and a timepiece function is disposed and at least a part of the authentication mark is disposed at a portion different from the wiring on the antenna.

7 Claims, 6 Drawing Sheets

TIMEPIECE WITH PHYSICAL AUTHENTICATION MARK

RELATED APPLICATIONS

This application claims priority under 35 U.S.C. § 119 to Japanese Patent Application No. 2018-041193 filed on Mar. 7, 2018, the entire content of which is hereby incorporated by reference.

BACKGROUND OF THE INVENTION

1. Field of the Invention

The present disclosure relates to a timepiece.

2. Description of the Related Art

In a timepiece having a wireless communication function, it is necessary to visibly display an authentication mark such as a technically applicable mark indicating that conformity with a technical standard of a wireless communication technology is authenticated. For example, in JP-A-2016-173240, a mark plate is provided as a separate component from a printed circuit board.

However, since the authentication mark itself does not affect product characteristics, for example, in a case where a member for disposing the authentication mark is provided, or the like, there is a problem that a space efficiency inside the timepiece may be reduced by displaying the authentication mark.

SUMMARY OF THE INVENTION

Therefore, embodiments of the invention provide a timepiece in which reduction of a space efficiency inside the timepiece by disposing an authentication mark is suppressed in a case where a communication function requiring authentication is mounted.

According to embodiments of the invention, there is provided a timepiece including an antenna performing at least one of reception and transmission of an electric wave of a specific communication; an authentication mark certifying that the specific communication conforms to a technical standard; and a board in which wiring connected to a control unit for controlling the specific communication and a timepiece function is disposed and at least a part of the authentication mark is disposed at a portion different from the wiring on the antenna.

In the timepiece, it is preferable that the antenna is disposed on a first surface of the board, the authentication mark is disposed on a second surface of the board, facing a side opposite to the first surface, and a projection region of the antenna on the second surface overlaps at least a part of the authentication mark.

In the timepiece, it is preferable that the timepiece further includes a case body which houses the board and in which an opening portion allowing the board to be visibly recognized is formed; and a back lid that closes the opening portion, in which the board is disposed so that a surface on which the authentication mark is disposed in the board faces the back lid.

In the timepiece, it is preferable that the timepiece further includes a conduction member connected to at least one of a power supply for supplying electric power to the control unit and the wiring; a case body which houses the board and in which an opening portion allowing the board to be visibly recognized is formed; and a back lid that closes the opening portion, in which a projection region of the opening portion on the board overlaps the authentication mark, and in which a projection region of the conduction member on the board does not overlap the authentication mark.

In the timepiece, it is preferable that at least a part of the authentication mark is formed of a non-conductive material.

In the timepiece, it is preferable that the antenna includes a chip antenna.

In the timepiece, it is preferable that the authentication mark includes at least one of visible characters and numbers.

DETAILED DESCRIPTION OF THE PREFERRED EMBODIMENTS

Hereinafter, embodiments of the invention will be described with reference to the drawings. In the following description, the same reference numerals are given to configurations having the same or similar functions. Duplicate description of those configurations may be omitted in some cases.

Figure 1:
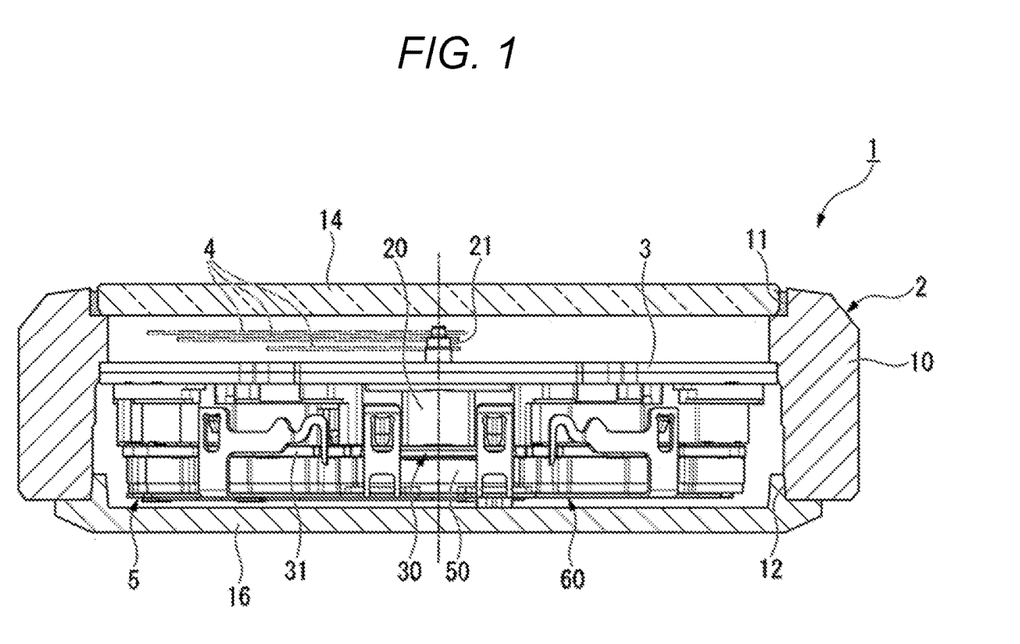
FIG. 1 is a sectional view illustrating a timepiece of an embodiment.

FIG. 1 is a sectional view illustrating a timepiece of an embodiment.

As illustrated in FIG. 1, a timepiece 1 is an analog type electronic timepiece and includes a timepiece case 2, a dial 3, pointers 4, and a movement 5. The timepiece case 2 includes a cylindrical case body 10 of which both ends are opened, a windshield glass 14 for closing one end opening portion 11 of the case body 10, and a back lid 16 for closing other end opening portion 12 (opening portion) of the case body 10. The case body 10 houses the dial 3, the pointers 4, and the movement 5. Moreover, in the following description, a windshield glass 14 side with respect to the back lid 16 is referred to as a "front side" and a side opposite thereto is referred to as a "back side".

The dial 3 is formed in a disk shape. The dial 3 is visibly recognized via the windshield glass 14. A rotation shaft 21 (described later) of the movement 5 is inserted into a center of the dial 3.

The pointers 4 are disposed between the dial 3 and the windshield glass 14. The pointers 4 are attached to the rotation shaft 21.

The movement 5 drives the pointers 4. The movement 5 is formed in a disk shape of which a thickness direction coincides with a forward and backward direction (see FIG. 2). The movement 5 is disposed between the dial 3 and the back lid 16. The movement 5 is visibly recognized through the other end opening portion 12 of the case body 10 in a state where the back lid 16 of the timepiece case 2 is removed.

Figure 2:
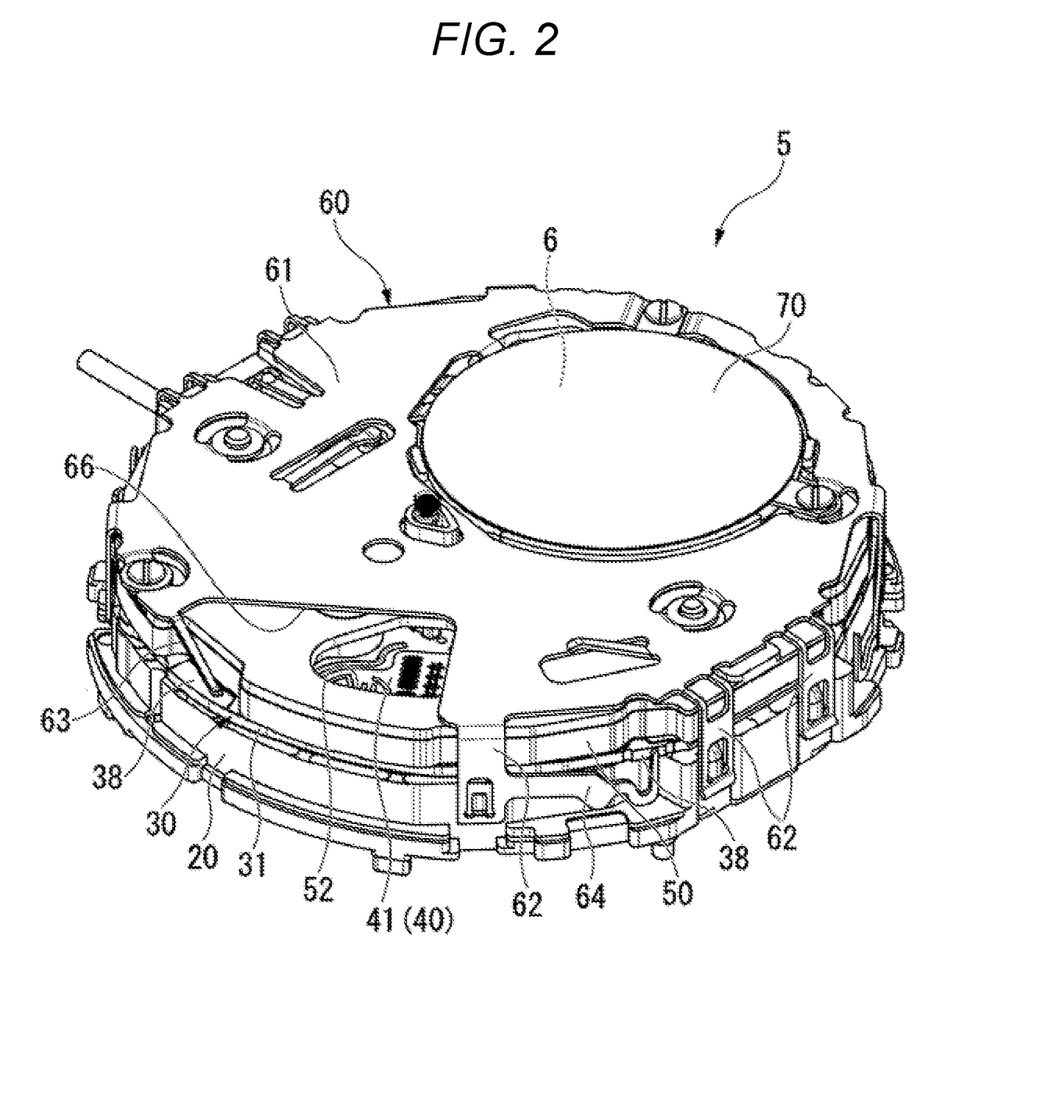
FIG. 2 is a perspective view of a movement viewed from a back side.
Figure 3:
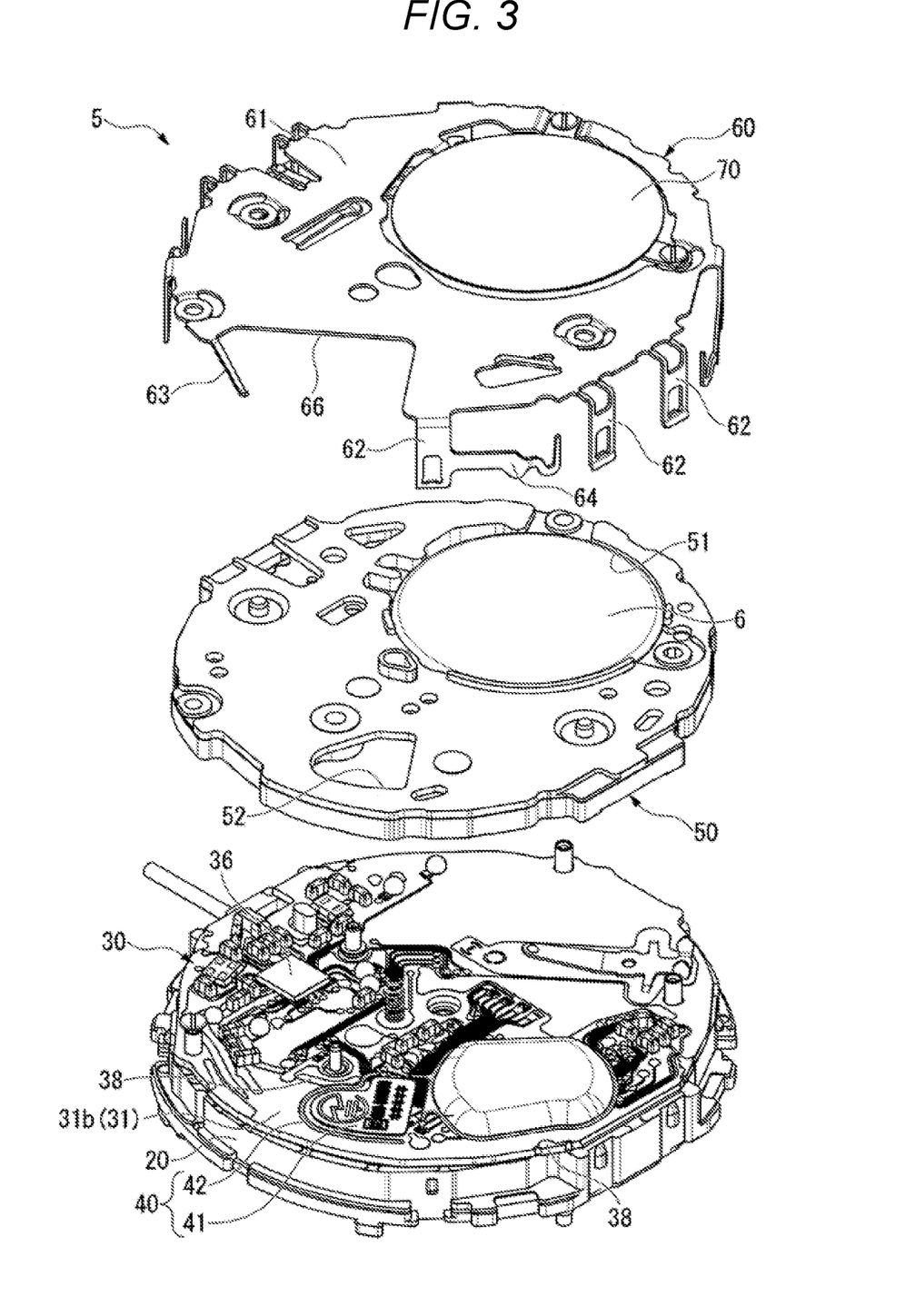
FIG. 3 is an exploded perspective view of the movement viewed from the back side.

FIG. 2 is a perspective view of the movement viewed from the back side. FIG. 3 is an exploded perspective view of the movement viewed from the back side.

As illustrated in FIGS. 2 and 3, the movement 5 includes a main plate 20, the rotation shaft 21 (see FIG. 1), a motor (not illustrated), a train wheel (not illustrated), a circuit block 30, an authentication mark 40, a battery supporting frame 50, a conduction member 60, and a battery clamp 70.

As illustrated in FIG. 3, the main plate 20 is formed in a disk shape. The main plate 20 is disposed on the back side of the dial 3 (see FIG. 1). The main plate 20 supports the motor, the train wheel, or the like.

As illustrated in FIG. 1, the rotation shaft 21 protrudes from the main plate 20 toward the front side. The rotation shaft 21 is rotated by a driving force of the motor transmitted via the train wheel.

Figure 4:
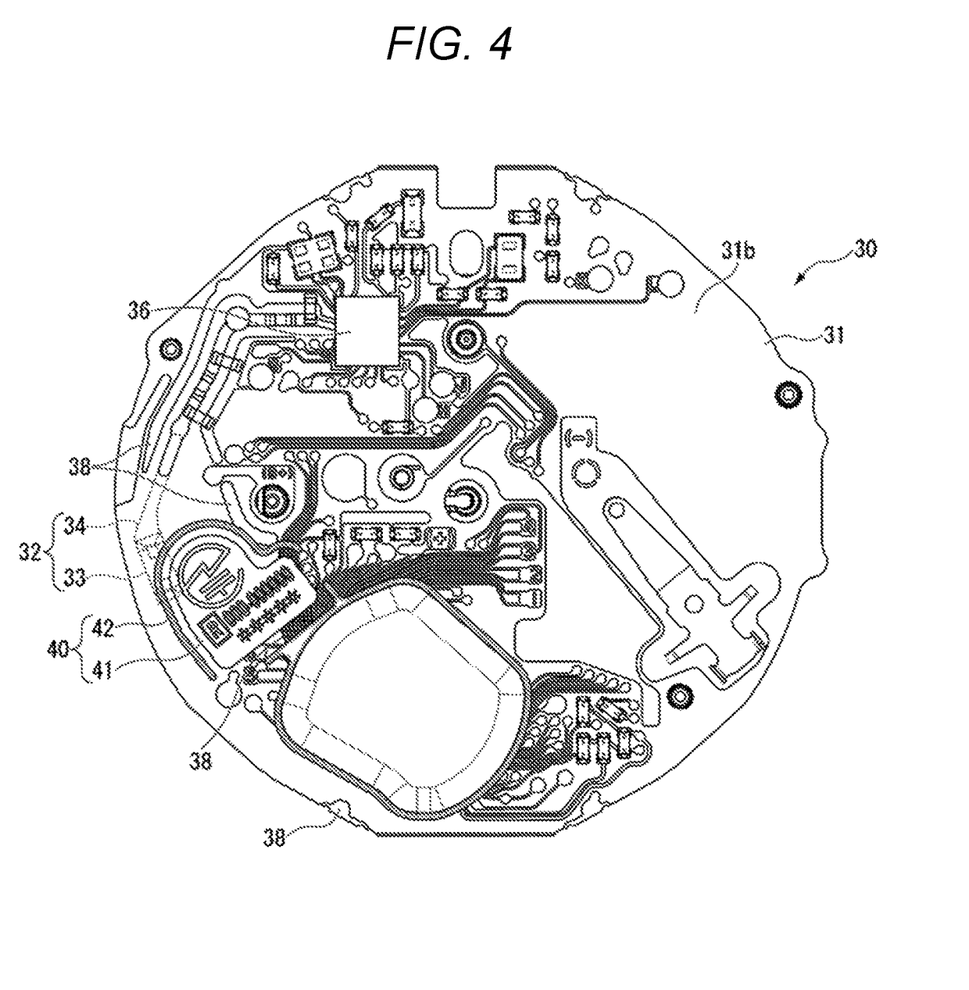
FIG. 4 is a plan view of a circuit block viewed from the back side.

FIG. 4 is a plan view of a circuit block viewed from the back side.

As illustrated in FIG. 4, the circuit block 30 includes a board 31 formed in a disk shape, an antenna 32 attached to the board 31, and an IC 36 (control unit).

As illustrated in FIG. 1, the board 31 is disposed, so that a first surface 31a (see FIG. 5) faces a dial 3 side and a second surface 31b (see FIGS. 4 and 6) faces the back lid 16. The board 31 is visibly recognized through the other end opening portion 12 of the case body 10 by removing the battery supporting frame 50, the conduction member 60, the battery clamp 70, or the like from the movement 5.

Figure 5:
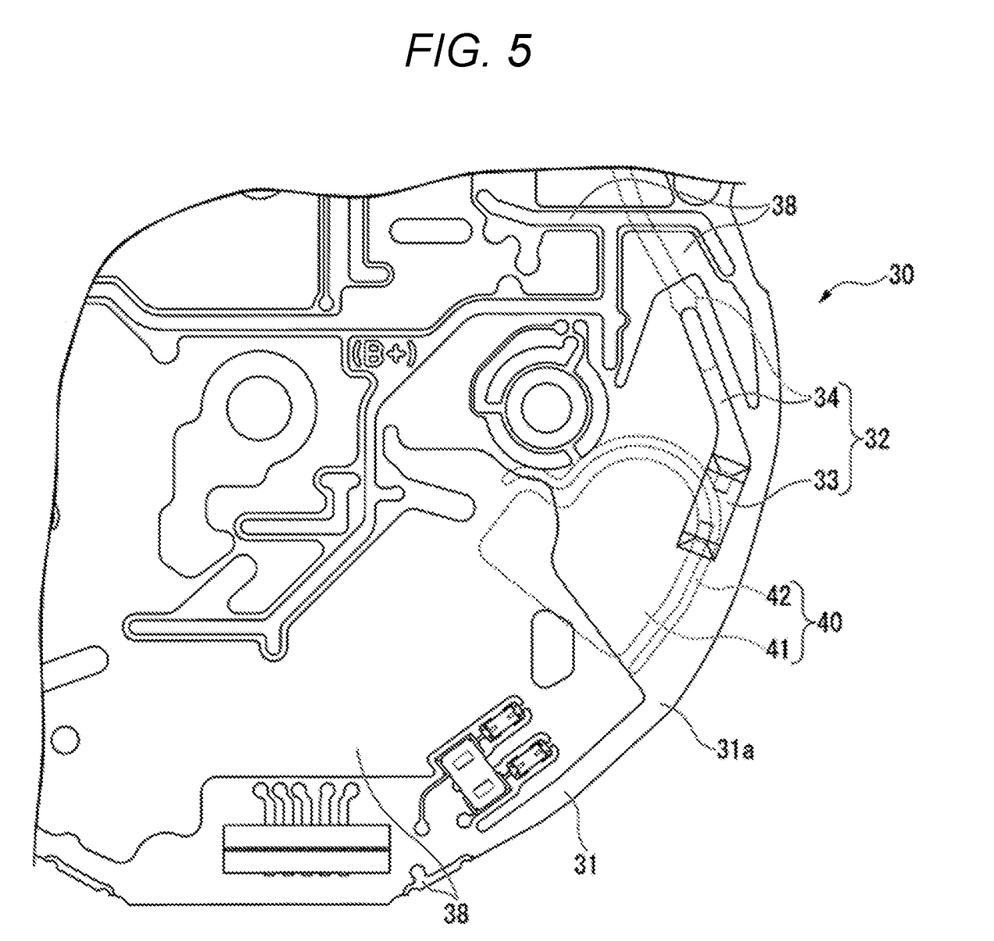
FIG. 5 is an enlarged plan view of the circuit block viewed from a front side.

FIG. 5 is an enlarged plan view of the circuit block viewed from the front side.

As illustrated in FIG. 5, the antenna 32 transmits and receives an electric wave of specific communication. The specific communication is short-distance wireless communication, wireless communication for standard electronic waves, wireless communication for GPS, or the like. The short-distance wireless communication is, for example, Bluetooth (registered trademark), Wi-Fi (registered trademark), Near Field Communication (NFC), or the like. The antenna 32 includes a chip antenna 33 and an antenna wiring 34 that is print wiring formed on the board 31 and is connected to the chip antenna 33. The chip antenna 33 is disposed on the first surface 31a of the board 31. The chip antenna 33 has directivity and is disposed so that a radiation direction in which a radiation intensity is maximum faces a space on the front side of the board 31. The antenna wiring 34 extends from the chip antenna 33 on the first surface 31a of the board 31 and then extends on the second surface 31b.

As illustrated in FIG. 4, the IC 36 controls the specific communication by the antenna 32 and a timepiece function. Wiring 38 different from the antenna wiring 34 is connected to the IC 36. The wiring 38 is printed wiring which is not connected to the chip antenna 33 and is not conducted to the chip antenna 33. The wiring 38 is disposed on the first surface 31a, the second surface 31b, and an outer peripheral end surface of the board 31. The wiring 38 is disposed away from the chip antenna 33 as viewed from the forward and backward direction. That is, the circuit block 30 has a region where the wiring 38 is not disposed around the chip antenna 33 as viewed from the forward and backward direction. Therefore, it is possible to suppress that the electric wave transmitted and received by the antenna 32 is absorbed by the wiring 38.

Figure 6:
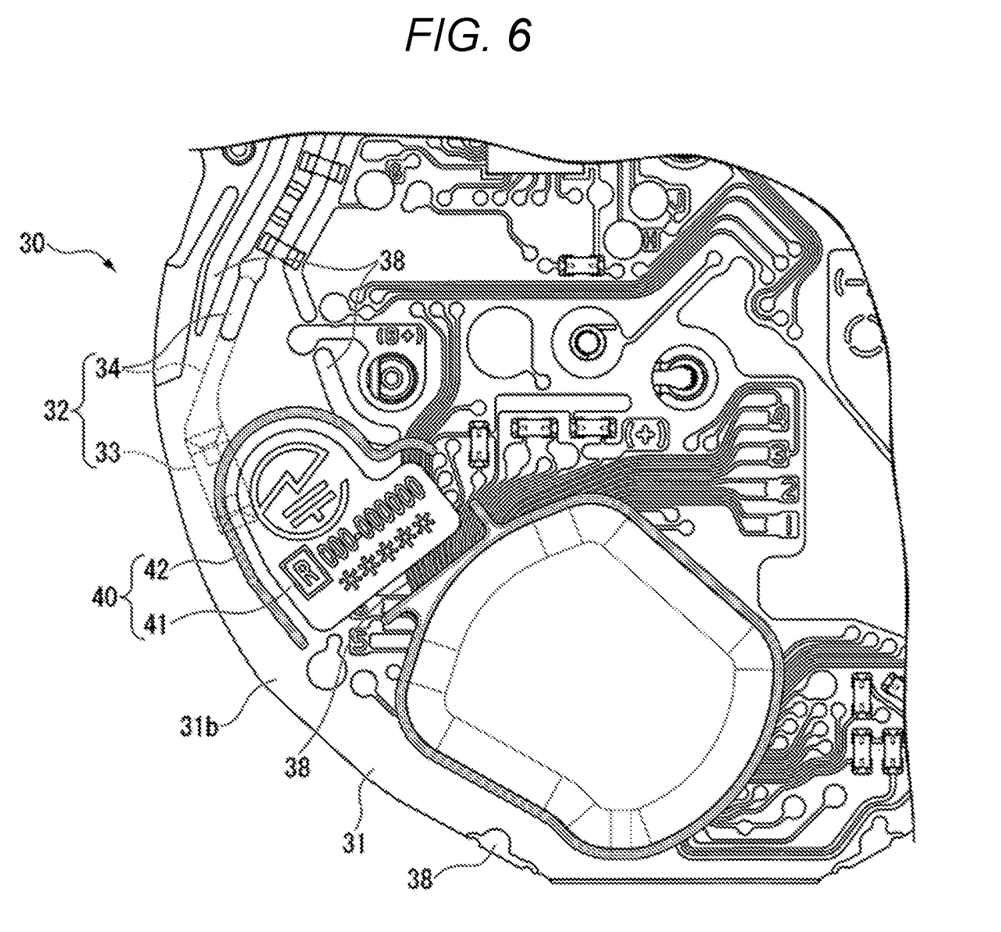
FIG. 6 is an enlarged plan view of the circuit block viewed from the back side.

FIG. 6 is an enlarged plan view of the circuit block viewed from the back side.

As illustrated in FIG. 6, the authentication mark 40 is a mark certifying that the specific communication conforms a technical standard using the antenna 32. In the embodiment, the authentication mark 40 is a technically applicable mark. In addition, in the embodiment, the authentication mark 40 displays authentication with respect to the movement 5. The authentication mark 40 is disposed on the second surface 31b of the board 31. The authentication mark 40 includes an authentication mark body 41 including characters and numbers which are capable of visibly recognized, and a guide portion 42 indicating a position at which the authentication mark body 41 is to be displayed. The authentication mark body 41 is a seal, of which at least a part is formed of paper, a resin sheet, or the like which is a non-conductive material. The guide portion 42 is disposed so as to surround at least a part of the authentication mark body 41. The guide portion 42 extends along an outer edge of the authentication mark body 41. The guide portion 42 is formed of a solder resist or the like which is a non-conductive material.

At least a part of the authentication mark 40 is disposed on the antenna 32 at a portion different from the wiring 38 as viewed from the forward and backward direction. That is, at least a part of the authentication mark 40 is disposed closer to the antenna 32 as viewed from the forward and backward direction than all the wirings 38 other than the antenna wiring 34 disposed on the board 31. In the embodiment, the authentication mark 40 is disposed so that a part of the authentication mark body 41 overlaps a part of the chip antenna 33. That is, a projection region of the antenna 32 on the second surface 31b of the board 31 overlaps a part of the authentication mark body 41. Moreover, the projection region of the antenna 32 on the second surface 31b of the board 31 is a region which overlap the antenna 32 on the second surface 31b of the board 31 as viewed from the forward and backward direction (the same applied to the other projection regions described below). In addition, a projection region of the other end opening portion 12 (see FIG. 1) of the case body 10 on the board 31 overlaps the authentication mark 40. That is, the authentication mark 40 is formed at a position which is visibly recognized from the forward and backward direction through the other end opening portion 12 of the case body 10.

As illustrated in FIG. 3, the battery supporting frame 50 supports a battery 6 (power supply) for supplying electric power to the IC 36. The battery supporting frame 50 is formed in a disk shape having substantially the same diameter as that of the board 31 of the circuit block 30 and is disposed on the back side of the circuit block 30. A battery housing portion 51 for housing the battery 6 and a support frame opening portion 52 allowing at least a part of the authentication mark 40 to be visibly recognized from the back side are formed in the battery supporting frame 50. The battery housing portion 51 is formed at a position which does not overlap the authentication mark 40 as viewed from the forward and backward direction. The battery housing portion 51 is recessed from the back side toward the front side. The support frame opening portion 52 is a through-hole penetrating the battery supporting frame 50 in the forward and backward direction. The support frame opening portion 52 is formed at a position overlapping the authentication mark body 41 of the authentication mark 40 as viewed from the forward and backward direction. Therefore, the projection region of the battery supporting frame 50 on the board 31 does not overlap the authentication mark body 41 of the authentication mark 40.

The conduction member 60 is connected to both the battery 6 and the wiring 38 on the board 31 of the circuit block 30. The conduction member 60 is formed of one sheet of a metal plate. The conduction member 60 includes a circuit clamp 61, a locking portion 62, a contact spring 63, and a switch spring 64.

The circuit clamp 61 is formed in a disk shape substantially having the same diameter as that of the battery supporting frame 50 and is disposed on the back side of the battery supporting frame 50. The circuit clamp 61 is formed so as to avoid the battery housing portion 51 of the battery supporting frame 50 as viewed from the forward and backward direction. A conduction member opening portion 66 allowing at least a part of the authentication mark 40 is visibly recognized from the back side is formed in the circuit clamp 61. In the illustrated example, the conduction member opening portion 66 is formed by cutting out an outer peripheral edge of the circuit clamp 61 toward a center. The conduction member opening portion 66 is formed at a position overlapping the authentication mark body 41 of the authentication mark 40 as viewed from the forward and backward direction. Therefore, the projection region of the conduction member 60 on the board 31 does not overlap the authentication mark body 41 of the authentication mark 40.

As illustrated in FIG. 2, a plurality of locking portions 62 are provided. The locking portion 62 extends from the outer peripheral edge of the circuit clamp 61 toward the front side. The locking portion 62 is engaged with a protrusion provided on the outer peripheral surface of the main plate 20. Therefore, the conduction member 60 holds the circuit block 30 and the battery supporting frame 50 between the circuit clamp 61 and the main plate 20.

The contact spring 63 extends from the circuit clamp 61 toward the front side. The contact spring 63 is in pressure contact with a part of the wiring 38 on the board 31 of the circuit block 30. Therefore, the conduction member 60 is electrically connected to a part of the wiring 38 on the board 31.

The switch spring 64 is provided at a position corresponding to a button (not illustrated) provided in the timepiece case 2. The switch spring 64 extends from the locking portion 62 in a direction intersecting the forward and backward direction. The switch spring 64 is separated from the circuit block 30 in an initial state. When the button is operated, the switch spring 64 is pushed by the button and is bent, and is in contact with the wiring 38 on an outer peripheral end surface of the board 31 of the circuit block 30. Therefore, the IC 36 of the circuit block 30 detects that the button is operated.

As illustrated in FIG. 3, the battery clamp 70 is disposed on a side opposite to the battery supporting frame 50 across the battery 6. The battery clamp 70 is formed of a metal plate and is in contact with the battery 6 from the back side. The battery clamp 70 is fixed to the battery supporting frame 50 with screws or the like. The battery clamp 70 is electrically connected to the conduction member 60. Therefore, the conduction member 60 electrically connects the battery 6 to the circuit block 30. Moreover, the conduction member 60 and the battery 6 may be directly in contact with each other and electrically connected.

As described in detail above, the timepiece 1 of the embodiment includes the antenna 32 that receives the electric wave of the specific communication, the authentication mark 40 certifying that the specific communication conforms to the technical standard, and the board 31 in which the wiring 38 connected to the IC 36 that controls the specific communication and the timepiece function is disposed, and at least a part of the authentication mark 40 is disposed on the antenna 32 of a portion different from the wiring 38.

In the configuration, in a case where the wiring 38 is disposed away from the antenna 32 in order to suppress that the electric wave of the specific communication is absorbed, a region in which a component connected to the wiring 38 is not mounted is provided in the vicinity of the antenna 32. Therefore, at least a part of the authentication mark 40 is disposed at a position different from the wiring 38 in the board 31 on the antenna 32, so that it is possible to reduce an extra region required for disposing the authentication mark 40. Therefore, in a case where the communication function requiring authentication is mounted, it is possible to improve a space efficiency inside the timepiece 1.

In addition, in a case where the authentication mark is not disposed at a portion different from the wiring 38 in the board 31 on the antenna 32, since it is necessary to mount an element so as to avoid the authentication mark, a degree of freedom in designing a layout on the board 31 decreases. Therefore, at least a part of the authentication mark 40 is disposed at a portion different from the wiring 38 in the board 31 on the antenna 32, so that it is possible to improve the degree of freedom in designing the layout on the board 31.

In addition, the antenna 32 is disposed on the first surface 31a of the board 31, the authentication mark 40 is disposed on the second surface 31b of the board 31, and the projection region of the antenna 32 on the second surface 31b of the board 31 overlaps at least a part of the authentication mark 40. According to the configuration, the authentication mark 40 is disposed at a portion closer to the antenna 32. Therefore, it is possible to further improve the space efficiency inside the timepiece 1.

In addition, the board 31 is disposed so that the second surface 31b on which the authentication mark 40 is disposed faces the back lid 16. According to the configuration, it is possible to visibly recognize the authentication mark 40 by removing the back lid 16 from the case body 10. That is, it is possible to visibly recognize the authentication mark 40 without detaching the board 31 from the timepiece case 2 and reversing the board 31. Therefore, disassembly of the timepiece 1 when visibly recognizing the authentication mark 40 can be suppressed to be minimized and it is possible to easily visibly recognize the authentication mark 40.

In addition, the projection region of the other end opening portion 12 of the case body 10 on the board 31 overlaps the authentication mark 40 and the projection region of the conduction member 60 on the board 31 does not overlap the authentication mark 40. According to the configuration, the authentication mark 40 can be disposed at the position at which the authentication mark 40 is visibly recognized through the other end opening portion 12 of the case body 10 and the conduction member 60 can be provided so that the authentication mark 40 is not shielded. Therefore, it is possible to easily and visibly recognize the authentication mark 40.

Furthermore, since at least a part of the projection region of the conduction member 60 on the board 31 does not overlap the authentication mark 40 disposed at the portion different from the wiring 38 in the board 31 on the antenna 32, the conduction member 60 is formed so as to avoid the vicinity of the antenna 32. Therefore, it is possible to suppress the absorption of the electric wave by the conduction member 60 and to favorably keep a state of communication using the antenna 32.

In addition, at least a part of the authentication mark 40 is formed by the non-conductive material. According to the configuration, it is possible to suppress the absorption of the electric wave by the authentication mark 40 and to favorably keep the state of communication using the antenna 32.

In addition, the antenna 32 includes the chip antenna 33. According to the configuration, in general, since the chip antenna 33 is small in size, a separation distance from the chip antenna 33 to the wiring 38 tends to increase with respect to an external dimension of the chip antenna 33. Therefore, at least a part of the authentication mark 40 tends to dispose at the portion different from the wiring 38 in the board 31 on the antenna 32. Therefore, it is possible to provide a configuration that is easy to exhibit the above-described operation effect.

In addition, the authentication mark 40 includes characters and numbers which are visibly recognized. In the configuration, it is necessary to secure a large region for disposing the authentication mark 40 in order to visibly recognizing the characters and the numbers. Therefore, at least a part of the authentication mark 40 is disposed at the portion different from the wiring 38 in the board 31 on the antenna 32, so that it is possible to effectively reduce the extra region required for disposing the authentication mark 40. Therefore, it is possible to secure the degree of freedom in designing the layout on the board 31.

Moreover, the invention is not limited to the embodiment described with reference to the drawings, and various modification examples are conceivable in the technical scope thereof.

For example, in the embodiment, the authentication mark 40 is the technically applicable mark, but is not limited thereto and the authentication mark may be a CE mark or an FCC mark.

In addition, in the embodiment, a part of the authentication mark 40 is disposed at the portion different from the wiring 38 in the board 31 on the antenna 32, but an entirety of the authentication mark may be disposed at the portion different from the wiring 38 in the board 31 on the antenna 32.

In addition, in the embodiment, the authentication mark body 41 is disposed so as to overlap a part of the chip antenna 33 as viewed from the forward and backward direction, but the authentication mark body 41 may be disposed so as to overlap the entirety of the chip antenna 33 as viewed from the forward and backward direction.

In addition, in the embodiment, the antenna 32 for transmitting and receiving the electric wave of the specific communication is attached to the board 31, but an antenna for performing one of reception and transmission may be attached.

Besides, it is possible to appropriately replace the configuration elements in the embodiment with well-known constituent elements within the scope not deviating from the gist of the invention.

What is claimed is:

1. A timepiece comprising:
    an antenna configured to perform at least one of reception and transmission of communication through electromagnetic waves;
    a circuit board having a first surface and a second surface opposite to the first surface, the circuit board having a control circuit mounted thereon to control the communication and a timepiece function, wherein the control circuit is connected to conductive patterns printed on the circuit board to carry electrical signals; and
    a physical authentication mark perceptively visible by human eyes, wherein the physical authentication mark is attached at a part of the circuit board in such a manner as to avoid overlapping the conductive patterns and overlap at least a part of the antenna viewed through the circuit board from the first and second surfaces of the circuit board.

2. The timepiece according to claim 1, wherein the antenna is disposed on the first surface of the circuit board,
    the physical authentication mark is disposed on the second surface of the circuit board, and
    the antenna has a projection region on the second surface that overlaps at least a part of the physical authentication mark viewed through the circuit board from the first and second surfaces of the circuit board.

3. The timepiece according to claim 1, further comprising:
    a case body configured to house the circuit board inside of the case body, wherein the case body has an opening through which the physical authentication mark attached to the circuit board is visible from outside; and
    a back lid that closes the opening portion.

4. The timepiece according to claim 1, wherein
    the conductive patterns are connected to at least one terminal of a power supply for supplying electric power to the control circuit, the timepiece further comprising:
    a case body configured to house the circuit board inside the case body, wherein the case body has an opening through which the physical authentication mark attached to the circuit board is visible,
    wherein the antenna has a projection region attached to the circuit board that overlaps at least a part of the physical authentication mark but does not overlap the physical authentication mark viewed through the circuit board from the first and second surfaces of the circuit board.

5. The timepiece according to claim 1, wherein at least a part of the physical authentication mark is formed of a non-conductive material.

6. The timepiece according to claim 1, wherein the antenna includes a chip antenna.

7. The timepiece according to claim 1, wherein the physical authentication mark includes at least one of visible characters and numbers.

* * * * *